UNITED STATES PATENT OFFICE.

ARNO BEHR, OTTO H. KRAUSE, AND HENRY E. NIESE, OF JERSEY CITY, NEW JERSEY, ASSIGNORS TO F. O. MATTHIESSEN & WIECHERS SUGAR REFINING COMPANY, OF SAME PLACE.

PROCESS OF PURIFYING SACCHARINE LIQUIDS OF LOW GRADES.

SPECIFICATION forming part of Letters Patent No. 240,879, dated May 3, 1881.

Application filed August 27, 1880. (No specimens.)

*To all whom it may concern:*

Be it known that we, ARNO BEHR, OTTO H. KRAUSE, and HENRY E. NIESE, of Jersey City, New Jersey, have invented a Process of Purifying Saccharine Liquids of Low Grades, of which the following is a specification.

Our process is adapted for employment for the purification of the washings containing in concentrated form the impurities of raw cane-sugar obtained by the process described in F. O. Matthiessen's patent, No. 169,823, dated November 9, 1875, and also for the purification of cane-sugar, molasses, and "black-strap."

The essential feature of our invention consists in precipitating the impurities of the sugar by forming them into insoluble compounds with lime.

The successful practice of our process depends upon the following conditions, which are to be rigidly adhered to: First, excessive dilution of the saccharine material; secondly, the maintenance of a temperature of from 110° to 120° Fahrenheit while the solution is alkaline; thirdly, the rapid manipulation of the solution while under treatment.

In detail, our process is as follows: We first dissolve the material to be purified in water, forming a dilute solution, preferably of about 15° Baumé density. We then add lime ($C_aO$) in the proportion of from one to two per cent. of the original weight of the dry substance, and heat the solution to a temperature of from 110° to 120° Fahrenheit, and filter it at such temperature through bag-filters, and thereby effect the mechanical removal of a certain proportion of precipitated impurities. Immediately upon filtration we add to the filtered liquid an acid—preferably carbonic or phosphoric acid—in sufficient quantity to neutralize the alkali, or until only a slight alkaline reaction is observable. Then, dealing with small quantities of the solution at a time, in order that the operation may be rapidly effected, we add more lime, in the proportion of from one to five per cent., by weight, according to the amount of impurities present, taking care to keep the solution neutral by further additions of carbonic or phosphoric acid. As the result of this mode of treatment, certain other impurities, not precipitated by the first treatment with lime, will now form an insoluble compound with the carbonate or phosphate of lime, as the case may be, and be precipitated. Caustic lime and inverted sugar or glucose, the latter of which is generally present in a considerable proportion in cane-sugar of low grade, act chemically upon each other in such a way that the inverted sugar is transformed into an acid substance, which forms a soluble compound with lime. The lime, in turn, ceases to be caustic, and cannot be precipitated with carbonic acid. This reation is more or less energetic, acccording to the temperature and the prolongation of the chemical contact of the lime and inverted sugar; and in order to weaken and retard it we keep the temperature of the liquid under treatment while it is alkaline as low as possible—that is to say, from 110° to 120° Fahrenheit—and conduct the treatment with great rapidity by dealing with small quantities at a time, and promptly removing the precipitated impurities by mechanical filtration. When the solution shows a neutral or slightly alkaline reaction the temperature can be raised without injury. We therefore conclude our process by raising the temperature of the solution to 160° or 170° Fahrenheit, and again filter it through bag-filters or presses. The clear liquid may then be run through bone-black and evaporated or directly boiled down without further filtration.

We have found that the amount of impurities removed by our process is as follows, namely: By the addition of one and a half per cent. of lime, ($C_aO$,) one to three quarters per cent. of impurities, (calculated on the dry substance of the sugar,) are removed in the first or alkaline operation, and about one-half per cent. more is removed, in combination with the carbonate or phosphate of lime, as the case may be, if, after the first filtration, from one and a half to two per cent. of lime ($C_aO$) is added, and then neutralized with carbonic or phosphoric acid.

Although the total amount of impurities removed by our process is only from one to one and a quarter per cent., yet, owing to the nature of these impurities, this constitutes an efficient purification.

We claim as our invention—

The herein-described process of purifying a saccharine liquid of low grade, which consists, first, in diluting it to a density of preferably 15° Baumé, then treating it with milk of lime and raising the solution to a temperature of from 110° to 120° Fahrenheit and filtering it through cloth, and then immediately adding sufficient acid, preferably carbonic or phosphoric acid, to neutralize, or nearly neutralize, it, then treating it in small quantities, with additional lime and acid, whereby certain impurities remaining present are made to combine with the lime and acid and form an insoluble compound, which is removed from the solution by mechanical filtration.

ARNO BEHR.
O. H. KRAUSE.
H. E. NIESE.

Witnesses:
C. CHRISTIE,
ISAAC ROMAINE.